US009082152B2

(12) United States Patent
Mura

(10) Patent No.: US 9,082,152 B2
(45) Date of Patent: Jul. 14, 2015

(54) NUMERICAL MODELLING APPARATUS AND METHOD FOR PRICING, TRADING AND RISK ASSESSMENT

(76) Inventor: Michael E. Mura, St. Albans (GB)

( * ) Notice: Subject to any disclaimer, the term of this patent is extended or adjusted under 35 U.S.C. 154(b) by 694 days.

(21) Appl. No.: 12/946,892

(22) Filed: Nov. 16, 2010

(65) Prior Publication Data

US 2011/0167022 A1   Jul. 7, 2011

(30) Foreign Application Priority Data

Jan. 5, 2010   (GB) .................................. 1000091.7

(51) Int. Cl.
*G06Q 40/00*   (2012.01)
*G06Q 40/08*   (2012.01)
*G06Q 40/06*   (2012.01)

(52) U.S. Cl.
CPC ............... *G06Q 40/08* (2013.01); *G06Q 40/06* (2013.01)

(58) Field of Classification Search
USPC ..................................................... 705/35–45
See application file for complete search history.

(56) References Cited

U.S. PATENT DOCUMENTS

| 5,819,238 | A | 10/1998 | Fernholz |
| 6,484,152 | B1 * | 11/2002 | Robinson .................... 705/36 R |
| 7,401,041 | B2 * | 7/2008 | Goldfarb et al. ............. 705/36 R |
| 7,620,577 | B2 | 11/2009 | Arnott et al. |
| 7,630,930 | B2 * | 12/2009 | Almgren et al. ............ 705/36 R |
| 2004/0199448 | A1 * | 10/2004 | Chalermkraivuth et al. ... 705/36 |
| 2006/0190371 | A1 * | 8/2006 | Almgren et al. ................ 705/35 |
| 2007/0288397 | A1 * | 12/2007 | Frahm et al. ................ 705/36 R |
| 2008/0052249 | A1 * | 2/2008 | Jeng ............................ 705/36 R |
| 2008/0208604 | A1 * | 8/2008 | Nishiyama et al. ............... 705/1 |

(Continued)

OTHER PUBLICATIONS

Williams, John Burr, 1938, "The Theory of Investment Value," Harvard University Press, Cambridge MA.

(Continued)

*Primary Examiner* — Gregory Johnson
(74) *Attorney, Agent, or Firm* — Panitch Schwarze Belisario & Nadel LLP

(57) ABSTRACT

A numerical modelling apparatus and method of performing numerical modelling are described. An input unit receives signals giving information relating to a set of assets. A processor unit is arranged to provide a set of Risk Relation Matrices $V_\tau$ for set of investment horizons indicated by $\tau$. Each of the Risk Relation Matrices $V_\tau$ comprises a plurality of elements, wherein each of the elements represents a relationship of risk related to a respective pair of the assets and each element is given by a scalar product of two risk vectors, such that each of the assets has an associated risk vector according to the elements of the risk relation matrix. The processor unit is arranged to decompose each of the Risk Relation Matrices $V_\tau$ into eigenvectors and eigenvalues according to $V_\tau = E_\tau \cdot \Lambda_\tau \cdot E'_\tau$, where, at each tenor $\tau$, $E_\tau$ is a set of eigenvectors of the risk matrix $V_\tau$ in columns, $\Lambda_\tau$ is the corresponding diagonal eigenvalue matrix, and $E'_\tau$ is the transpose of $E_\tau$. Components of each of the risk vectors are derived at each tenor $\tau$ in the basis of unit independent risks by the corresponding row of the matrix product $E_\tau \cdot \Lambda_\tau^{1/2}$ relating to each of the assets. An output unit is arranged to output the components of each of the risk vectors as a risk vector data set.

7 Claims, 3 Drawing Sheets

(56) References Cited

U.S. PATENT DOCUMENTS

| | | | |
|---|---|---|---|
| 2008/0222252 A1 | 9/2008 | White | |
| 2008/0288420 A1* | 11/2008 | Michaud et al. | 705/36 R |
| 2009/0099976 A1* | 4/2009 | Kawamoto et al. | 705/36 R |
| 2009/0106133 A1* | 4/2009 | Redmayne | 705/35 |
| 2010/0057638 A1* | 3/2010 | Markov et al. | 705/36 R |
| 2011/0022539 A1* | 1/2011 | Joenk | 705/36 R |
| 2012/0116993 A1* | 5/2012 | Ouimet et al. | 705/36 R |
| 2014/0081889 A1* | 3/2014 | Renshaw | 705/36 R |

OTHER PUBLICATIONS

Gordon, Myron J., 1959, "Dividends, Earnings and Stock Prices," Review of Economics and Statistics, 41: pp. 99-105.

Lintner, John, 1965, "The Valuation of Risk Assets and the Selection of Risky Investments in Stock Portfolios and Capital Budgets," Reivew of Economics and Statistics, 47:1, pp. 13-37.

Markowitz, Harry, 1952, "Portfolio Selection," Journal of Finance, 7:1, pp. 77-91.

Markowtz, Harry, 1959, "Portfolio Selecton: Efficient Diversification of Investments," Cowles Foundation Monograph No. 16, New York, John Wiley & Sons, Inc.

Markowtz, Harry, 2008, "CAPM Investors Do Not Get Paid for Bearing Risk: A Linear Relation does Not Imply Payment for Risk," Journal of Portfolio Management, 34:2 (Winger), pp. 91-94.

Mossin, Jan, 1966, "Equilibrium in a Capital Asset Market," Econometrica, 34, pp. 768-783.

Roll, Richard, 1977, "A Critique of the Asset Pricing Theory's Tests," Journal of Financial Economics, 4:2, pp. 129-176.

Sharpe, William F., 1964, "Capital Asset Prices: A Theory of Market Equilibrium Under Conditions of Risk," Journal of Finance, 19:3, pp. 425-442.

Tobin, James, 1958, "Liquidity Preference as Behavior Toward Risk," Review of Economic Studies, 67, pp. 65-86.

Duffie, Darrell, 1996, "Dynamic Asset Pricing Theory (Second Edition)," Princeton University Press, Princeton, New Jersey.

Megginson, William L., 1997, "Corporate Finance Theory," Addison-Wesley, New York, Section 3.5.5 and chapter 4.

Choueifaty, Yves and Yves Coignard, 2008, "Toward Maximum Diversification," Journal of Portfolio Management, Fall 2008, 35:1, pp. 40-51.

* cited by examiner

NUMERICAL MODELLING APPARATUS AND METHOD FOR PRICING, TRADING AND RISK ASSESSMENT

BACKGROUND

1. Technical Field

The present invention relates generally to the field of computer-implemented apparatus for numerical modelling, and more particularly to computer apparatus and computer-implemented method for numerical modelling of financial assets.

2. Description of Related Art

It is known to provide computer-implemented financial modelling tools that attempt to model or predict possible outcomes in relation to various financial assets. These tools are relatively complex, and are typically implemented using computer apparatus with sufficient memory, processing power, etc to perform the necessary calculations underlying the relevant model.

There is a long-standing economic theory of equilibrium as the equality of supply and demand in an exchange economy. This equilibrium theory has been developed since the first general formulation by Walras in 1874.

In the related art, some asset pricing models based upon cashflows have been developed outside of an equilibrium framework. For instance, Williams in 1938 presented a method of obtaining the present value of a set of cashflows by appropriately discounting each cash flow. This method requires knowledge of the appropriate discount rate for each cash flow, but no guidance existed on how to unambiguously determine these discount rates when two or more cash flows are priced together. Gordon (1959) introduced a variation where the growth of the cashflows is modelled by a single parameter. Megginson (1997) reviewed the valuation of financial assets.

Later methods like the Capital Asset Pricing Model (CAPM) of Sharpe, Lintner and Mossin are based upon the Mean-Variance Portfolio Construction Approach of Markowitz and the Tobin Separation Theorem.

The Mean-Variance approach uses a set of expected returns (the Mean part) and a variance-covariance matrix (the Variance part). This Mean-Variance approach presupposes that a probability distribution for returns is available and only the first two moments of the distribution are employed, so that higher order moments, like skew and kurtosis, are neglected. Thus the statistical basis of the Mean-Variance and its limitations have been pointed out by many parties since it was developed.

The CAPM was built with the Mean-Variance framework as its description of risk. The CAPM often described as an equilibrium theory because if all market participants share the same views on expected return and expected covariance of return then they will all hold the same portfolio, suitably levered to allow for their risk tolerance, and market clearing requires this to be the market cap weighted portfolio if markets are efficient.

It is known to provide computer-implemented financial models that output indices representing relative performance of a portfolio of financial assets, or provide portfolio constructions that allow a portfolio of the financial assets to be bought or sold. In this field, dynamic asset pricing models have been developed in a general equilibrium setting (see Duffie) that have some applicability for derivative prices of financial assets but are less effective in determining useful valuations of underlying (non-derivative) financial assets.

As further background information see:

Williams, John Burr. 1938. The Theory of Investment Value, Harvard University Press, Cambridge Mass.

Gordon, Myron J. 1959. Dividends, Earnings and Stock Prices. Review of Economics and Statistics 41: pp. 99-105.

Lintner, John. 1965. The Valuation of Risk Assets and the Selection of Risky Investments in Stock Portfolios and Capital Budgets. Review of Economics and Statistics. 47:1, pp. 13-37.

Markowitz, Harry. 1952. Portfolio Selection. Journal of Finance. 7:1, pp. 77-91.

Markowitz, Harry. 1959. Portfolio Selection: Efficient Diversification of Investments. Cowles Foundation Monograph No. 16. New York: John Wiley & Sons, Inc.

Markowitz, Harry. 2008. CAPM Investors Do Not Get Paid for Bearing Risk: A Linear Relation Does Not Imply Payment for Risk. Journal of Portfolio Management. 34:2 (Winter), pp. 91-94

Mossin, January 1966, Equilibrium in a Capital Asset Market, Econometrica, 34, pp. 768-783.

Roll, Richard. 1977. A Critique of the Asset Pricing Theory's Tests. Journal of Financial Economics, 4:2, pp. 129-176.

Sharpe, William F. 1964. Capital Asset Prices: A Theory of Market Equilibrium under Conditions of Risk. Journal of Finance. 19:3, pp. 425-442.

Tobin, James. 1958. Liquidity Preference as Behavior Toward Risk. Review of Economic Studies. 67, pp. 65-86.

Duffie, Darrell 1996. Dynamic Asset Pricing Theory (Second Edition). Princeton University Press, Princeton, N.J.

Megginson, William L. 1997. Corporate Finance Theory. Addison-Wesley, New York. Section 3.5.5 and chapter 4.

Criticisms have been made of the assumptions of the CAPM and ability to empirically prove the CAPM, such as in Roll. This has lead to a number of other approaches being developed with varying degrees of success that tend to focus on relative rather than absolute valuation of financial assets. However, despite the efforts to develop effective asset pricing theories, there is still a lack of sufficiently accurate and practical models available to financial practitioners.

It is now desired to provide an apparatus and method to implement a financial modelling tool. In particular, an apparatus and method are desired which output more detailed and/or more accurate financial modelling information.

SUMMARY OF THE INVENTION

According to the present invention there is provided an apparatus and method as set forth in the appended claims. Other features of the invention will be apparent from the dependent claims, and the description which follows.

In one aspect there is provided a numerical modelling apparatus, the apparatus comprising: an input unit arranged to receive signals containing data having information relating to a set of assets; a processor unit arranged to: a) provide a set of Risk Relation Matrices $V_\tau$ for set of investment horizons indicated by $\tau$, wherein each of the Risk Relation Matrices $V_\tau$ comprises a plurality of elements, wherein each of the elements represents a relationship of risk related to a respective pair of the assets and each element is given by a scalar product of two risk vectors, such that each of the assets has an associated risk vector according to the elements of the risk relation matrix; b) decompose each Risk Relation Matrix $V_\tau$ into eigenvectors and eigenvalues according to $V_\tau = E_\tau \cdot \Lambda_\tau \cdot E'_\tau$ wherein, at each tenor $\tau$, $E_\tau$ is a set of eigenvectors of the risk matrix $V_\tau$ in columns, $\Lambda_\tau$ is the corresponding diagonal eigenvalue matrix, and $E'_\tau$ is the transpose of $E_\tau$; and c) derive components of each of the risk vectors at each tenor $\tau$ in the basis of unit independent risks by the corresponding row of the matrix product $E_\tau \cdot \Lambda_\tau^{1/2}$ relating to each of the assets; and an output unit arranged to output the components of each of the risk vectors as a risk vector data set onto a tangible computer-readable recording medium.

In one aspect, the input unit is arranged to receive risk information relating to the set of assets and provide the risk information to the processor unit.

In one aspect, the input unit is arranged to receive a set of the Risk Relation Matrices as the risk information and to provide the Risk Relation Matrices to the processor unit.

In one aspect, the input unit is arranged to receive the risk vectors as the risk information and the processor unit is arranged to provide the Risk Relation Matrices from the risk vectors.

In one aspect, the processor unit is arranged to provide a dataset of the term structure of the price of risk $m_\tau$ at each tenor $\tau$ for each of the assets i according to:

$$\frac{dP_{i\tau}}{P_{i\tau}} = \frac{dc_{i\tau}}{c_{i\tau}} - \frac{\tau}{\chi_{i\tau}} dr_{f\tau} - \frac{\tau}{\chi_{i\tau}} dm_\tau \sum_j \psi_{ij\tau} - \frac{\tau}{\chi_{i\tau}} m_\tau \sum_j d\psi_{ij\tau}$$

wherein, with respect to the tenor $\tau$ and asset i, $dP_{i\tau}$ is the change in contribution to price $P_{i\tau}$ the cash flow $c_{i\tau}$ over a period, $dc_{i\tau}$ is the change in the said cash flow $c_{i\tau}$ over the said period, $dr_{i\tau}$ is the change in the risk free interest rate $r_{f\tau}$ over the said period, $\psi_{ij\tau}$ the jth component of the risk vector for the asset i, $d\psi_{ij\tau}$ is the change in the jth component of the risk vector for the ith asset over the said period, $dm_\tau$ is the change in the price of risk $m_\tau$ over the said period $\chi_{i\tau}$ is given as $$\left(1 + r_{f\tau} + m_\tau \sum_j \psi_{ij\tau}\right),$$

and the value for $m_\tau$ is estimated by one or more methods of estimation from a cross-sectional analysis over a subset of assets from the set of assets.

In one aspect, the method of estimation is by iterative cross-sectional regression to self-consistency of $m_\tau$.

In one aspect, the processor unit is arranged to provide a dataset of the term structure of the cash flow $c_{i\tau}$ of tenor $\tau$ for each of the assets according to:

$$P_{i\tau} = \frac{c_{i\tau}}{\left(1 + r_{f\tau} + m_\tau \sum_j \psi_{ij\tau}\right)^\tau}$$

wherein, with respect to the tenor $\tau$ and asset i, $P_{i\tau}$ is the contribution to price of the cash flow $c_{i\tau}$, $r_{f\tau}$ the risk free interest rate, $\psi_{ij\tau}$ the jth component of the risk vector for the asset i, and $m_\tau$ is the price of risk.

In one aspect, the processor unit is arranged to provide a dataset of $P_{i\tau}$ as the contribution to price of the cash flow $c_{i\tau}$ at tenor $\tau$ for each of the assets according to:

$$P_{i\tau} = \frac{c_{i\tau}}{\left(1 + r_{f\tau} + m_\tau \sum_j \psi_{ij\tau}\right)^\tau}$$

wherein, with respect to the tenor $\tau$ and asset i, $c_{i\tau}$ is the cash flow of asset i, $r_{f\tau}$ the risk free interest rate, $\psi_{ij\tau}$ the jth component of the risk vector for the asset i, and $m_\tau$ is the price of risk.

In one aspect there is provided a method of performing numerical modelling using a computer apparatus, the method comprising: receiving signals at an input unit of the computer apparatus, the signals containing data having information relating to a set of assets; providing a set of Risk Relation Matrices $V_\tau$ for set of investment horizons indicated by $\tau$, using a processor unit of the computer apparatus, wherein each of the Risk Relation Matrices $V_\tau$ comprises a plurality of elements, wherein each of the elements represents a relationship of risk related to a respective pair of the assets and each element is given by a scalar product of two risk vectors, such that each of the assets has an associated risk vector according to the elements of the risk relation matrix; decomposing each Risk Relation Matrix $V_\tau$ into eigenvectors and eigenvalues according to $V_\tau = E_\tau \cdot \Lambda_\tau \cdot E'_\tau$, wherein, at each tenor $\tau$, $E_\tau$ is a set of eigenvectors of the risk matrix $V_\tau$ in columns, $\Lambda_\tau$ is the corresponding diagonal eigenvalue matrix, and $E'_\tau$ is the transpose of $E_\tau$; deriving components of each of the risk vectors at each tenor $\tau$ in the basis of unit independent risks by the corresponding row of the matrix product $E_\tau \cdot \Lambda_\tau^{1/2}$ relating to each of the assets; and outputting the components of each of the risk vectors as a risk vector data set onto a tangible computer-readable recording medium.

In one aspect there is provided a tangible computer-readable recording medium having recorded thereon instructions which when implemented by a computer apparatus perform a method of numerical modelling, wherein the method comprises the steps of: receiving signals at an input unit of the computer apparatus, the signals containing data having information relating to a set of assets; providing a set of Risk Relation Matrices $V_\tau$ for set of investment horizons indicated by $\tau$, using a processor unit of the computer apparatus, wherein each of the Risk Relation Matrices $V_\tau$ comprises a plurality of elements, wherein each of the elements represents a relationship of risk related to a respective pair of the assets and each element is given by a scalar product of two risk vectors, such that each of the assets has an associated risk vector according to the elements of the risk relation matrix; decomposing each Risk Relation Matrix $V_\tau$ into eigenvectors and eigenvalues according to $V_\tau = E_\tau \cdot \Lambda_\tau \cdot E'_\tau$ wherein, at each tenor $\tau$, $E_\tau$ is a set of eigenvectors of the risk matrix $V_\tau$ in columns, $\Lambda_\tau$ is the corresponding diagonal eigenvalue matrix, and $E'_\tau$ is the transpose of $E_\tau$; deriving components of each of the risk vectors at each tenor $\tau$ in the basis of unit independent risks by the corresponding row of the matrix product $E_\tau \cdot \Lambda_\tau^{1/2}$ relating to each of the assets; and outputting the components of each of the risk vectors as a risk vector data set onto a tangible computer-readable recording medium.

In one aspect, an apparatus is provided that receives a set of inputs representing data relevant to a set of financial assets, makes calculations based on those inputs according to a predetermined model, and produces one or more outputs representing data relevant to the set of assets. In one aspect, the apparatus includes an input unit, a processor unit, and an output unit. In one aspect, the apparatus is arranged to receive signals containing data having information, such as price information and/or risk information, relating to a set of assets; provide a set of Risk Relation Matrices each having a plurality of elements, wherein each of the elements represents a relationship of risk related to a respective pair of the assets and each element is given by a scalar product of two risk vectors, such that each of the assets has an associated risk vector according to the elements of the risk relation matrix; derive components of each of the risk vectors at each tenor in the basis of unit independent risks; and output the components of each of the risk vectors as a risk vector data set.

In one aspect, a method is provided for performing numerical modelling using a computer apparatus. The method may comprise receiving signals containing data having information, such as price information and/or risk information, relating to a set of assets; providing a set of Risk Relation Matrices each having a plurality of elements, wherein each of the elements represents a relationship of risk related to a respective pair of the assets and each element is given by a scalar product of two risk vectors, such that each of the assets has an associated risk vector according to the elements of the risk relation matrix, deriving components of each of the risk vectors at each tenor in the basis of unit independent risks; and outputting the components of each of the risk vectors as a risk vector data set.

In one aspect, the model outputs Term Structures of Price Of Risk. In one aspect, the model outputs Asset Cashflows. In one aspect, the model outputs Model Asset Prices. In one aspect, the model outputs Predicted Asset Prices. In one aspect, the model outputs Conditional Trade Recommendations.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

The example embodiments will be described in relation to a computer-implemented financial modelling tool that supports a model in relation to various financial assets.

Figure 1:
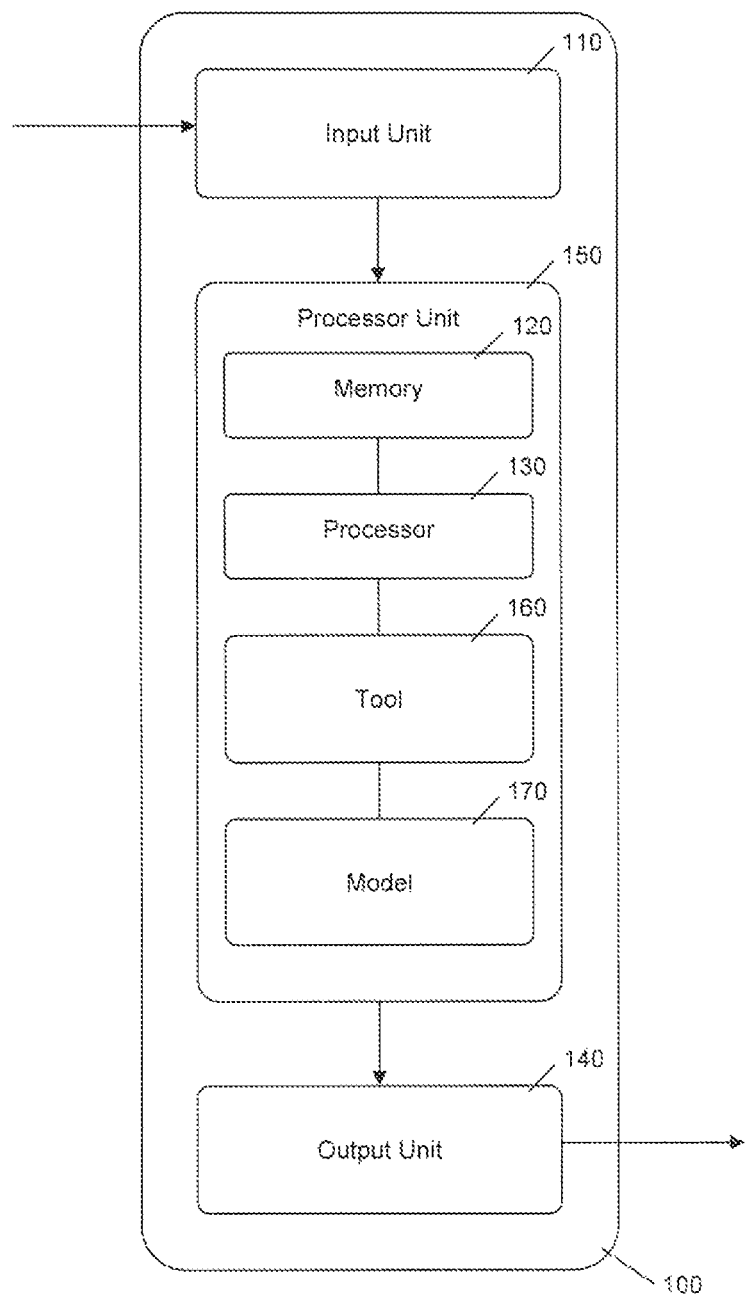
FIG. 1 is a schematic view of a numerical modelling apparatus according to one example embodiment.

FIG. 1 is a schematic view of a numerical modelling apparatus according to one example embodiment. In FIG. 1, the apparatus 100 comprises an input unit 110, a memory 120, a processor 130 and an output unit 140. The input unit 110 receives input data and user commands from any suitable interface. The memory 120 and the processor 130 together form a processor unit 150 that operates to perform calculations on the input data and to store the results of these calculations in the memory 120. The output unit 140 outputs the stored results through any suitable interface onto any suitable recording medium or display device. In one example, the apparatus 100 is a general purpose computing platform, such as a desktop computer or server computer, as will be familiar to those skilled in the art.

As shown in FIG. 1, the memory 120 and the processor 130 provide a tool 160 that performs financial modelling according to a predetermined model 170. This tool 160 uses the input data to perform calculations according to the predetermined model 170, and produces one or more outputs representing data relevant to the set of financial assets.

In one example, the input unit 110 is arranged to receive signals containing data having information relating to a set of assets. Conveniently, the input unit 110 receives price information relating to a plurality of financial assets. In one example, the input unit 110 receives an asset identifier for each asset and at least one price or return relating to each asset. Optionally, the price information is more detailed and may include further variables, such as a historical price set giving price information at various points in time relating to this asset. The price information may be incomplete, e.g. for some assets the price is provided for some points in time but not others. Optionally, the received price data is then processed by the tool 160 to provide a working set of prices, such as by interpolation to fill in the missing data items.

In one example, the input unit 110 is arranged to receive signals containing data having risk information relating to the set of assets. As an example, the risk information is option implied volatility. In one example, the input unit 110 receives implied volatility data without reference to prices or returns. In one example, the input unit 110 receives both the price information and the risk information.

The output unit 140 suitably records the output data onto a non-transient computer-readable recording medium. In one example, the output unit 140 outputs the data onto a hard disk drive or an optical disc.

In one example, the output unit 140 outputs the data onto a human-readable display device, such as a printer or a display screen.

The present model 170 is based on an improved description of the risk associated with the assets. When the primary preference of investors in financial assets is for greatest financial return for the lowest possible risk over an investment window, and if all rational investors behave in this manner, then prices should move to reflect this preference. When risk can be attributed to any asset to have a positive magnitude, it is possible to describe this risk as a vector whose basis is the set of all orthogonal, and hence independent, risk factors. Two risky assets have risks which are independent when the scalar product of two vectors describing the risk of each asset is zero.

In the present model, an equilibrium occurs between two or more assets or portfolios which are described by independent orthogonal risk basis vectors when the excess expected return over cash divided by the risk magnitude is identical for all of the individual risk basis vectors. In the example embodiments, the ratio is the Price of Risk, denoted by m. The model 170, in some embodiments, determines the Price of Risk for a set of asset prices, asset risks and asset risk correlations at each future investment tenor. The model 170, in some embodiments, determines and provides the term structure of the Price of Risk for a set of assets whose risk is described by the basis set of independent risk vectors.

In some embodiments the cashflows can be determined, based on the term structure of the Price of Risk. In another embodiment, where the timing and amount of future asset cashflows are known and provided as input to the system, the model 170 can provide Asset Prices. In some embodiments any of the set of the parameters can be provided to the model 170 or determined by the model 170 and these are used to predict future parameters which can be provided from the model 170. In some embodiments the Predicted parameters are utilised by the model 170 to provide Predicted Asset Prices. In some embodiments the model 170 generates conditional trade recommendations derived from observed asset prices, the Predicted Asset Prices and the operational constraints and conditions imposed within the model 170, and the resulting trade recommendations are provided by the model 170. In some embodiments the set of parameters are determined historically for the asset universe and for the individual assets, and these parameters and summary statistics of these parameters are provided by the model 170. In some embodiments the model 170 provides coefficients for the Differential (Asset) Pricing Formula for each asset in the asset universe. In some embodiments the model 170 is provided with input sets of Model Parameters and Differential Pricing Parameters and the Model Asset Prices are provided as scenario analytics for any of the different parameter sets provided. In some embodiments the Model Pricing Parameters and Differential Pricing Parameters are provided to the model 170, and stochastic time series to describe the evolution of the said parameters are used to generate and provide Model Simulated Asset Prices and Returns.

The present model 170 identifies that the pricing of independent risk in efficient financial markets must be such that an equilibrium is established. Here, the ratio of excess expected return to risk for two different independent sources of risk should be the same. In other words, independent risks are rewarded commensurately.

The present model 170 describes the risk of a general asset as a vector in the space of independent risks. The magnitude of the vector is the scalar measure of risk. A Risk Relation Matrix is made up of elements which are the scalar products of the risk vectors of pairs of asset risk vectors, represented in a basis of independent risk vectors at a given tenor. Risk is an input to the system. Asset risk implicitly reflects all available information that affects price; such information may include, for example, the supply of and demand for any financial asset or set of assets.

Since the excess expected return to risk ratio is the same for all independent risks describing risk of the assets in the model at any given time, and given the description of risk within the model, the expected excess returns of an asset is determined within the model as a scalar multiple of the sum of the expected excess returns (also known as risk premia) of all the independent risks represented in an asset risk vector. This provides a risk premium (expected excess return) to within the same scalar multiple (the Price of Risk, denoted as $m_\tau$ for the tenor $\tau$) for each cashflow at the same tenor for each asset in the investment universe.

Figure 2A:
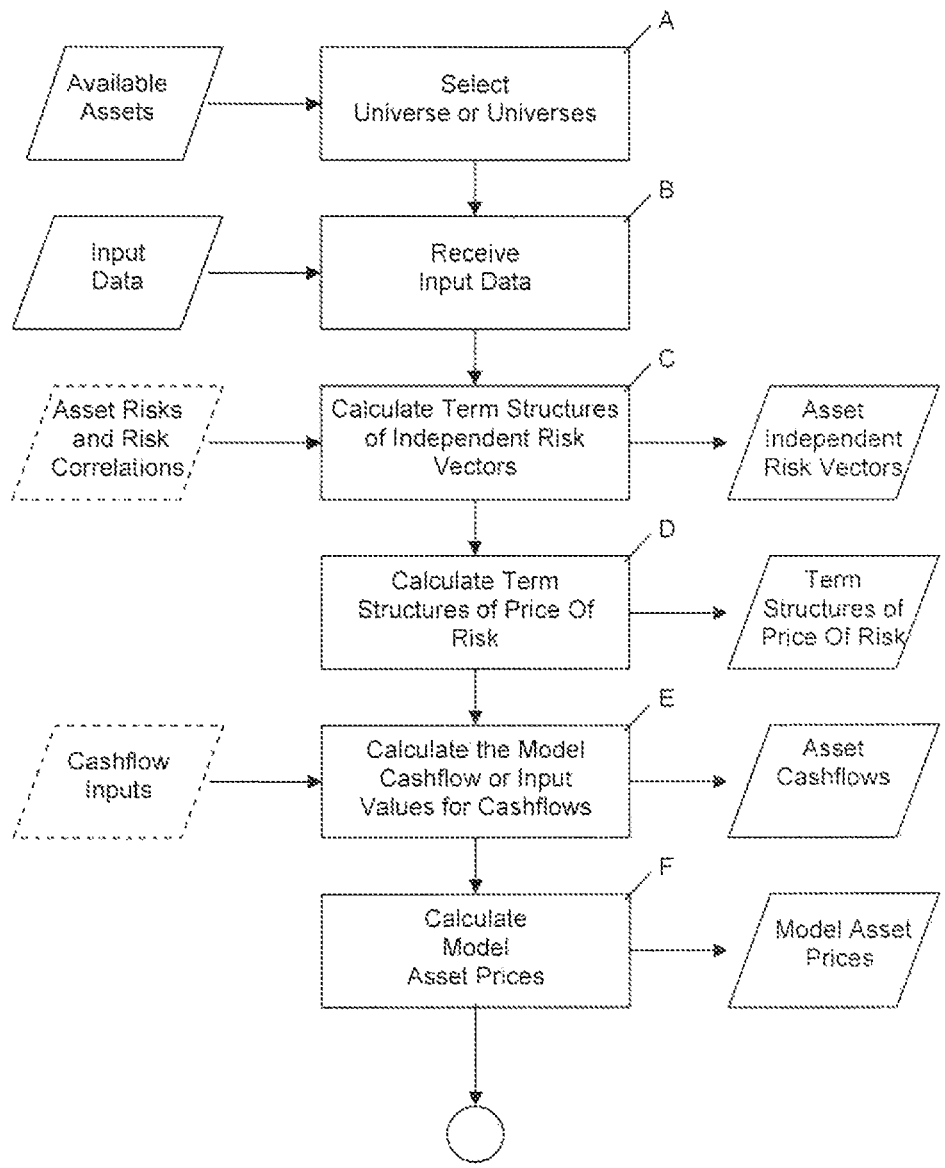
FIG. 2, consisting of FIGS. 2A and 2B, is a flowchart showing processes performed within the example numerical modelling apparatus.
Figure 2B:
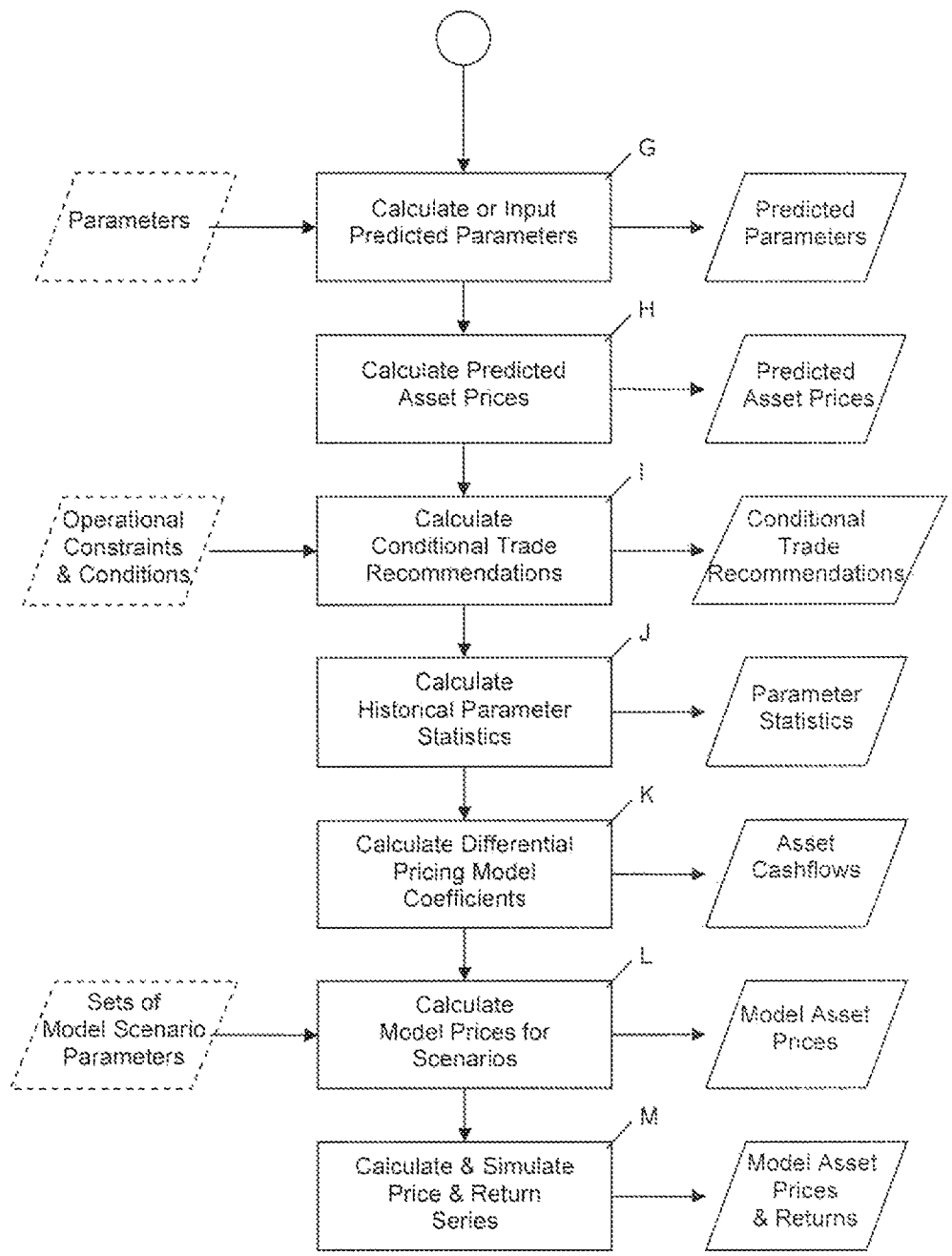

FIG. 2 is a schematic flowchart of one example embodiment of the processes that are performed within the apparatus of FIG. 1. Here, the flowchart illustrates various inputs that are received by the processes, and the outputs that may be generated from these processes.

Process A:

From the set of all possible assets available to investors, a subset of these is selected. The selection may be produced by screening the set of all possible investments by any suitable criterion; in some embodiments the screen can be based upon liquidity of the asset; in some embodiments the screen can be based upon the market capitalization of the asset; in some embodiments the screen can be activated on an asset because of a lack of sufficient data to proceed with the method; any screening criterion that leaves assets in the selected universe can be used within the system. The Input for Process A is the set of all assets available to investors and screens employed. The size of the asset universe selected is denoted here as N.

Process B:

Data is collected for the set of all assets in the universe of assets selected in Process A. In some embodiments this data includes identifiers for the assets; in some embodiments this data includes asset prices on a periodic frequency; in some embodiments this data includes total return asset prices; in some embodiments this data includes expected risks over an investment period; in some embodiments this data includes expected risk correlation between assets over an investment period; in some embodiments this data includes the risk relation matrix between the assets; in some embodiments the risk is given by asset volatilities implied from derivative asset prices over a known tenor; in some embodiments this data includes the known cashflows associated with assets in the asset universe; in some embodiments the cashflow data entered can be estimated; in some embodiments the term structure of risk free rates is provided to the model 170. In some embodiments, the data input is examined within the model 170 and is modified.

Process C:

Risk relation matrices are determined at as many tenors along the term structure as is necessary and the term structure of the asset independent risk vectors is provided for each asset at each tenor of the term structure. Each risk relation matrix, denoted here by the symbol $V_\tau$ at tenor $\tau$, is employed by the model 170 to provide the Asset Independent Risk vectors at the tenor $\tau$. In some embodiments, the Risk Relation Matrices at different tenors are provided as input to the system; in some embodiments, the Risk Relation Matrices at different tenors are determined from the input data provided to Process B. In some embodiments, the Risk Relation matrix can be approximated by a Variance-Covariance matrix; in some embodiments the risk relation matrix is determined from the asset risk data; in some embodiments it is determined from the risk correlation matrix; in some embodiments the risk relation matrix is symmetric positive definite; in some embodiments an output of Process C is the set of Risk Relation Matrices at different tenors; in some embodiments the Risk Relation Matrices are approximated to be the same at all tenors on the term structure, where the term structure is said to be flat. The Asset Independent Risk Portfolios at different tenors are provided by Process C; in some embodiments the Independent Risks are determined from an eigenvector matrix, $E_\tau$, and the corresponding diagonal eigenvalue matrix, $\Lambda_\tau$, of the Risk Relation Matrix, $V_\tau$, so that $$V_\tau = E_\tau \cdot \Lambda_\tau \cdot E'_\tau \tag{1}$$

In this equation, the symbol "." represents the operation of an inner product between matrices. In some embodiments one or more eigenvectors of $V_\tau$, each a column of the matrix $E_\tau$, have all elements multiplied by negative 1 to ensure that the risk premium of the corresponding independent risk vector is positive; in some embodiments the components of the independent risk vectors are given as the components of the eigenvector scaled by the positive square root of the associated eigenvalue so that the magnitude of each independent risk vector is one by construction; in some embodiments the risk of the cashflows at each tenor for each asset in the selected universe is expressed as a vector in the basis of the independent risks, where the magnitude of the said vector is the risk of the said asset given by the norm of the said vector, and the said vector depends upon the tenor $\tau$. In some embodiments the components of the asset risk vectors in the basis of independent risks at a tenor $\tau$ for an asset are given by the row of the matrix product $E_\tau \cdot \Lambda_\tau^{1/2}$ corresponding to the same said asset at the tenor $\tau$. Optionally, some of the independent risk vectors can be neglected so that a subspace of the basis of the independent risk vectors is employed by the process. In Process C the model 170 provides the components of the risk vectors for each asset at each tenor in basis of the independent risks at each tenor.

Process D:

The model 170 utilizes the input data, including the asset price return series, the history of the term structure of risk free rates and Asset Independent Risk Vectors. The contribution to asset price of an expected cashflow at a tenor $\tau$, $P_{i\tau}$ is given by the Pricing Formula:

$$P_{i\tau} = \frac{c_{i\tau}}{\left(1 + r_{f\tau} + m_\tau \sum_j \psi_{ij\tau}\right)^\tau} \tag{2}$$

In Equation (2), the terms are: $\tau$, the tenor (time to receiving the cashflow), in some embodiments $\tau$ is measured in selected units of time, typically years; $c_{i\tau}$ is the cashflow expected in $\tau$ said units of time, for the $i^{th}$ asset; $r_{f\tau}$ is the risk free rate at the tenor $\tau$; $m_\tau$ is the Price of Risk at the tenor $\tau$; $\psi_{ij\tau}$ is the $j^{th}$ component of the $i^{th}$ Asset Independent Risk Vector at the tenor $\tau$ in the said units of time.

The asset price $P_\tau$ for asset i is the sum over all expected cash flows $P_{i\tau}$:

$$P_i = \sum_\tau P_{i\tau}. \quad (3)$$

The Differential (Asset) Pricing Formula is given by:

$$\frac{dP_{i\tau}}{P_{i\tau}} = \frac{dc_{i\tau}}{c_{i\tau}} - \frac{\tau}{\chi_{i\tau}} dr_{f\tau} - \frac{\tau}{\chi_{i\tau}} dm_\tau \sum_j \psi_{ij\tau} - \frac{\tau}{\chi_{i\tau}} m_\tau \sum_j d\psi_{ij\tau} \quad (4)$$

where $\chi_{i\tau} = \left(1 + r_{f\tau} + m_\tau \sum_j \psi_{ij\tau}\right)$.

In some embodiments the Price of Risk, $m_\tau$, is determined by iterative cross-sectional regression as the change in asset prides, the sum of the independent risk components and the change in the sum of the independent risk components are already computed.

In some embodiments $m_\tau$ is determined by the minimisation of the error term in the cross-sectional regression. The model 170 provides the term structure of the Price of Risk for any set of dates where data has been made available to the model 170. Conveniently, the term structure of the Price of Risk is provided as output by the model 170.

Process E:

In some embodiments cashflows for the assets in the selected universe are input in Process E. In some embodiments the cashflows are known. In some embodiments the cashflows are estimated. In some embodiments the expected cashflows are determined from the asset prices and the term structure of the Asset Independent Risk Vectors and the term structure of the Price of Risk through a process reversing the Pricing Formula. The cashflows determined in Process E are provided by the model 170 as output data.

Process F:

The Pricing Formula is employed by the model 170 to generate the Asset Prices using the cashflow from Process E, the term structure of the risk free rate, the term structure of the Price of Risk and the term structure of the Asset Independent Risk vectors for dates where data has been provided to the model 170. The model 170 provides the said Asset Prices as output from the process.

Process G:

In some embodiments Process G accepts input for time series of the term structure of Price of Risk; in some embodiments Process G accepts input time series of the term structure of the Asset Independent Risk vector for assets in the selected universe of assets; in some embodiments Process G accepts input time series of the term structure of the risk free rate; in some embodiments Process G accepts input of the asset cashflows for any asset in the selected universe of assets. In some embodiments the process G accepts both input and data generated from the processes completed prior to Process G. Some embodiments predict the parameters used in the Asset Pricing Formula; in some embodiments momentum in the parameters is used to form the prediction; in some embodiments reversion to mean is used to form the prediction; in some embodiments Bayesian methods are used to predict the most likely value of the said predicted parameters; in some embodiments ARCH related models are used to predict the predicted parameters. The model 170 provides the said predicted parameters as output from the process.

Process H:

Process H uses the predicted parameters generated by process G to determine the Predicted Asset Prices using the Asset Pricing Formula; in some embodiments the Predicted Asset prices are the Asset Prices. The model 170 provides the Predicted Asset Prices as output data.

Process I:

Process H accepts operational trading constraints and conditions as input. The model 170 compares observed set of asset prices to the set of Predicted Asset Prices from Process H, and based upon the differences in these sets of prices, generates recommended trades as output. In some embodiments if the Predicted Asset Price for a particular asset is greater than the observed price of the same said asset then the model 170 will make the recommendation that the asset be bought. In some embodiments if the Predicted Asset Price for a particular asset is less than the observed price of the same said asset then the model 170 will make the recommendation that the asset be sold. In some embodiments the model 170 employs portfolio construction techniques to produce trading recommendations in the form of a buy and sell lists of assets with recommended position sizes for any transaction. In some embodiments the trade recommendations are provided directly into a machine or set of machines capable of executing the trades. The model 170 provides as output the asset identifiers along with corresponding trade recommendations, which suitably include the size (quantity) and the side (buy or sell) of each trade.

Process J:

Process J conveniently takes the parameters generated by the model 170 in prior steps as input. In some embodiments summary statistics for the parameters are generated and provided as output data by the model 170.

Process K:

The model 170 employs the data and parameters to generate the coefficients of the differentials in the Differential Pricing Formula. Suitably, the model 170 provides the said coefficients as output data.

Process L:

The model 170 generates Asset Prices for different sets of input scenario parameters for the Asset Pricing Formula. The model 170 provides the resulting sets of Asset Prices for the set of parameters specified in each scenario.

Process M:

The model 170 uses stochastic time series models to generate parameter time series which are used to calculate Simulated Asset Prices and Returns for assets in the selected universe of assets. In some embodiments some of the parameters are considered to be constant. In some embodiments some of the parameters are described by parameterised stochastic time series. In some embodiments these simulated time series are provided directly to calculation engines; in some embodiments these engines calculate derivative asset pricing and properties. In some embodiments the model 170 provides the Simulated Asset Prices and Return series.

As discussed above, the term structure of the Price of Risk is the same term structure for all assets. This allows the term structure of the Price of Risk to be determined from changes in asset prices, the term structure of the Asset Independent Risk vector for each of the assets in the investment universe and for changes in the term structure of the Asset Independent Risk vectors for each asset in the selected investment universe.

The contribution to price from the total cashflow at the tenor τ for a given asset labelled i, namely $P_{i\tau}$ is given by the formula:

$$P_{i\tau} = \frac{c_{i\tau}}{\left(1 + r_{f\tau} + m_\tau \sum_j \psi_{ij\tau}\right)^\tau} \quad (5)$$

Here, the terms in the formula are: τ, the tenor (time to receiving the cashflow). In some embodiments τ measured in selected units of time, typically years; $c_{i\tau}$ is the cashflow expected in τ said units of time; $r_{f\tau}$ is the risk free rate at the tenor τ; $m_\tau$ is the Price of Risk at the tenor τ; $\psi_{ij\tau}$ is the $j^{th}$ component of the $i^{th}$ Asset Independent Risk Vector at the tenor τ in the said units of time.

The asset price $P_\tau$ for asset i is the sum over all expected cash flows $P_{i\tau}$:

$$P_i = \sum_\tau P_{i\tau}. \quad (6)$$

This equation allows prices to be determined from all the quantities presented in Equation (1). The explicit dependence of asset prices to the term structure of asset risk vectors and the term structure of the Price of Risk, $m_\tau$ relates prices directly to risk through a set of equilibrium conditions that satisfy the desired equilibrium.

A differential form of the Pricing Formula, here called the Differential Pricing Formula or Differential Asset Pricing Formula, is given for each contribution $P_{i\tau}$ to the price of asset i by $$\frac{dP_{i\tau}}{P_{i\tau}} = \frac{dc_{i\tau}}{c_{i\tau}} - \frac{\tau}{\chi_{i\tau}} dr_{f\tau} - \frac{\tau}{\chi_{i\tau}} dm_\tau \sum_j \psi_{ij\tau} - \frac{\tau}{\chi_{i\tau}} m_\tau \sum_j d\psi_{ij\tau} \quad (7)$$

where $\chi_{i\tau} = \left(1 + r_{f\tau} + m_\tau \sum_j \psi_{ij\tau}\right)$.

This equation can be rearranged in the form of:

$$\underbrace{\frac{dP_{i\tau}}{P_{i\tau}} \frac{\chi_{i\tau}}{\tau}}_{Y} = \underbrace{\frac{dc_{i\tau}}{c_{i\tau}} \frac{\chi_{i\tau}}{\tau} - dr_{f\tau}}_{\alpha} \underbrace{-dm_\tau \sum_j \psi_{ij\tau}}_{+\beta_{dm} X_{dm}} \underbrace{-m_\tau \sum_j d\psi_{ij\tau}}_{+\beta_m X_m} \quad (8)$$

This equation (8) resembles a linear regression where the coefficients of the independent variables $X_{dm}$ and $X_{dm}$, $\beta_m$ and $\beta_{dm}$ respectively, presenting the best estimates of $m_\tau$ and $dm_\tau$ respectively and in some embodiments are determined cross-sectionally for all assets (indexed by i) for cashflows at a given tenor τ. As $m_\tau$ appears on the left hand side of the equation (Y) an initial value for $m_\tau$ followed by an iterative process of regressions is appropriate to refine $m_\tau$ until it converges to self-consistency in the equation 8.

If an approximation is made that the term structure of the Asset Independent Risk vectors is assumed or determined to be flat and the term structure of the Price of Risk is assumed to be flat then the determination of flat Price of Risk term structure is facilitated.

With a knowledge of risk in the form of the term structures of the Asset Independent Risk Vectors for each asset and their changes, the asset cashflows and the term structures of the Price of Risk and the risk free rate, the Asset Prices can be determined for all assets in a selected asset universe.

The Asset Prices can be compared to observed asset prices and asset forward prices and trading recommendations can be delivered by the model 170 based upon a set of trading algorithms as output or to a suitable trading engine. In addition, the values of the parameters in the Pricing Equation can be altered based upon a set of predictive algorithms, or upon the views of investors, and Predicted Asset Prices can be obtained; these predicted prices can be compared to observed asset prices and observed forward asset prices and trading recommendations can be delivered by the model 170 based upon a set of trading algorithms as output or supplied to a suitable trading engine.

The variations of the parameters in the Asset Pricing Formula and the Differential Asset Pricing Formula enable the model 170 to perform sensitivity analyses of the Asset Prices to these variations and to provide the results and aggregated results of these analyses as output. These results allow the model 170 to provide risk management metrics for asset management, hedging and speculative investment, and economic forecasting. The model 170 in some embodiments outputs the sensitivity of the asset prices and changes in the asset prices to estimation and data errors that might be found in the data input into the model 170.

In some embodiments, the model 170 also produces Simulated Asset Prices and Returns by representing the parameters in the Asset Pricing Formula or the Differential Asset Pricing formula by stochastic parameter processes and these simulated asset prices are provided by the model 170 as output simulated time series. The stochastic parameter processes can be correlated in some embodiments. For example the Price of Risk could be represented by stochastic processes of the form:

$$dm = +ma_m dt + m\sigma_m dW_m, \quad (9)$$

This example is a geometric Brownian motion. Other example embodiments use other stochastic process represented by a stochastic differential equation. In some embodiments the model 170 provides the Simulated Asset Prices and Returns as time series as output and also as an input directly into derivative pricing engines.

In summary, the apparatus and method described herein, in some embodiments, generate Price of Risk term structures, Asset Cashflows and Asset Prices. These data and other data uniquely provided by the system and method are exceptionally valuable to investors who: believe that asset markets or portions of asset markets are in a suitable equilibrium; want to understand the current market valuation of financial assets relative to their equilibrium valuations; want to understand the sensitivity of the assets to the changes in the parameters governing the Asset Prices and the Differential Asset Prices; want to use Simulated Prices and Simulated Differential Prices and Returns as input for derivative pricing engines and for financial and economic forecasting.

At least some of the example embodiments may be constructed, partially or wholly, using dedicated special-purpose hardware. Terms such as 'component'. 'module' or 'unit' used herein may include, but are not limited to, a hardware device, such as a Field Programmable Gate Array (FPGA) or Application Specific Integrated Circuit (ASIC), which performs certain tasks.

Also, elements of the example embodiments may be configured to reside on an addressable storage medium and be configured to execute on one or more processors. That is, some of the example embodiments may be implemented in the form of a computer-readable storage medium having recorded thereon instructions that are, in use, executed by a computer system. The medium may take any suitable form but examples include solid-state memory devices (ROM, RAM, EPROM, EEPROM, etc.), optical discs (e.g. Compact Discs, DVDs, Blu-Ray discs and others), magnetic discs, magnetic tapes and magneto-optic storage devices.

In some cases the medium is distributed over a plurality of separate computing devices that are coupled by a suitable communications network, such as a wired network or wireless network. Thus, functional elements of the invention may in some embodiments include, by way of example, components such as software components, object-oriented software components, class components and task components, processes, functions, attributes, procedures, subroutines, segments of program code, drivers, firmware, microcode, circuitry, data, databases, data structures, tables, arrays, and variables.

Further, although the example embodiments have been described with reference to the components, modules and units discussed herein, such functional elements may be combined into fewer elements or separated into additional elements.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A numerical modeling apparatus, the apparatus comprising:
   an input arranged to receive signals containing data having information relating to a set of assets;
   a processor unit arranged to:
   provide a set of Risk Relation Matrices $V_\tau$ for set of investment horizons indicated by $\tau$, wherein each of the Risk Relation Matrices $V_\tau$ comprises a plurality of elements, wherein each of the elements represents a relationship of risk related to a respective pair of the assets and each element is given by a scalar product of two risk vectors, such that each of the assets has an associated risk vector according to the elements of the risk relation matrix;
   decompose each Risk Relation Matrix $V_\tau$ into eigenvectors and eigenvalues according to:

$$V_\tau = E_\tau \cdot \Lambda_\tau \cdot E'_\tau$$

wherein, at each tenor $\tau$, $E_\tau$ is a set of eigenvectors of the risk matrix $V_\tau$ in columns, $\Lambda_\tau$ is the corresponding diagonal eigenvalue matrix, and $E'_\tau$ is the transpose of $E_\tau$; and
   set components of each of the risk vectors at each tenor $\tau$ in the basis of unit independent risks to the corresponding row of the matrix product $E_\tau \cdot \Lambda_\tau^{1/2}$ relating to each of the assets;
   provide a dataset of the term structure of the price of risk $m_\tau$ at each tenor $\tau$ for each of the assets i according to:

$$\frac{dP_{i\tau}}{P_{i\tau}} \frac{\chi_{i\tau}}{\tau} = \frac{dc_{i\tau}}{c_{i\tau}} \frac{\chi_{i\tau}}{\tau} - dr_{f\tau} - dm_\tau \sum_j \psi_{ij\tau} - m_\tau \sum_j d\psi_{ij\tau}$$

wherein, with respect to the tenor $\tau$ and asset i, $dP_{i\tau}$ is the change in contribution to price $P_{i\tau}$ the cash flow $c_{i\tau}$ over a period, $dc_{i\tau}$ is the change in the said cash flow $c_{i\tau}$ over the said period, $dr_{f\tau}$ is the change in the risk free interest rate $r_{f\tau}$ over the said period, $\psi_{ij\tau}$ the jth component of the risk vector for the asset i, $d\psi_{ij\tau}$ is the change in the jth component of the risk vector for the ith asset over the said period, $dm_\tau$ is the change in the price of risk $m_\tau$ over the said period, $\chi_{i\tau}$ is given as $$\left(1 + r_{f\tau} + m_\tau \sum_j \psi_{ij\tau}\right),$$

and the value for $m_\tau$ is estimated by one or more methods of cross-sectional analysis over a subset of assets from the set of assets; and
   an output arranged to output the components of each of the risk vectors as a risk vector data set onto a tangible computer-readable recording medium or a display device.

2. The apparatus of claim 1, wherein the input unit is arranged to receive risk information relating to the set of assets and provide the risk information to the processor unit.

3. The apparatus of claim 2, wherein the input unit is arranged to receive a set of the Risk Relation Matrices as the risk information and to provide the Risk Relation Matrices to the processor unit.

4. The apparatus of claim 2, wherein the input unit is arranged to receive the risk vectors as the risk information and the processor unit is arranged to provide the Risk Relation Matrices from the risk vectors.

5. The apparatus of claim 1, wherein the method of estimation is by iterative cross-sectional regression to self-consistency of $m_\tau$.

6. A method of performing numerical modeling using a computer apparatus, the method comprising:
   receiving signals at an input of the computer apparatus, the signals containing data having information relating to a set of assets;
   providing a set of Risk Relation Matrices $V_\tau$ for set of investment horizons indicated by $\tau$ using a processor unit of the computer apparatus, wherein each of the Risk Relation Matrices $V_\tau$ comprises a plurality of elements, wherein each of the elements represents a relationship of risk related to a respective pair of the assets and each element is given by a scalar product of two risk vectors, such that each of the assets has an associated risk vector according to the elements of the risk relation matrix;

decomposing each Risk Relation Matrix $V_\tau$ into eigenvectors and eigenvalues according to:

$$V_\tau = E_\tau \cdot \Lambda_\tau \cdot E'_\tau$$

wherein, at each tenor $\tau$, $E_\tau$ is a set of eigenvectors of the risk matrix $V_\tau$ in columns, $\Lambda_\tau$ is the corresponding diagonal eigenvalue matrix, and $E'_\tau$ is the transpose of $E_\tau$;

setting components of each of the risk vectors at each tenor $\tau$ in the basis of unit independent risks to the corresponding row of the matrix product $E_\tau \cdot \Lambda_\tau^{1/2}$ relating to each of the assets;

providing a dataset of the term structure of the price of risk $m_\tau$ at each tenor $\tau$ for each of the assets i according to:

$$\frac{dP_{i\tau}}{P_{i\tau}}\frac{\chi_{i\tau}}{\tau} = \frac{dc_{i\tau}}{c_{i\tau}}\frac{\chi_{i\tau}}{\tau} - dr_{f\tau} - dm_\tau \sum_j \psi_{ij\tau} - m_\tau \sum_j d\psi_{ij\tau}$$

wherein, with respect to the tenor $\tau$ and asset i, $dP_{i\tau}$ is the change in contribution to price $P_{i\tau}$ the cash flow $c_{i\tau}$ over a period, $dc_{i\tau}$ is the change in the said cash flow $c_{i\tau}$ over the said period, $dr_{f\tau}$ is the change in the risk free interest rate $r_{f\tau}$ over the said period, $\psi_{ij\tau}$ the jth component of the risk vector for the asset i, $d\psi_{ij\tau}$ is the change in the jth component of the risk vector for the ith asset over the said period, $dm_\tau$ is the change in the price of risk $m_\tau$ over the said period, $\chi_{i\tau}$ is given as $$\left(1 + r_{f\tau} + m_\tau \sum_j \psi_{ij\tau}\right),$$

and the value for $m_\tau$ is estimated by one or more methods of cross-sectional analysis over a subset of assets from the set of assets; and outputting the components of each of the risk vectors as a risk vector data set onto a tangible computer-readable recording medium or a display device.

7. A tangible computer-readable recording medium having recorded thereon instructions which, upon execution by a computer apparatus, result in operations comprising:

receiving signals at an input of the computer apparatus, the signals containing data having information relating to a set of assets;

providing a set of Risk Relation Matrices $V_\tau$ for set of investment horizons indicated by $\tau$, using a processor unit of the computer apparatus, wherein each of the Risk Relation Matrices $V_\tau$ comprises a plurality of elements, wherein each of the elements represents a relationship of risk related to a respective pair of the assets and each element is given by a scalar product of two risk vectors, such that each of the assets has an associated risk vector according to the elements of the risk relation matrix;

decomposing each Risk Relation Matrix $V_\tau$ into eigenvectors and eigenvalues according $$V_\tau = E_\tau \cdot \Lambda_\tau \cdot E'_\tau$$

wherein, at each tenor $\tau$, $E_\tau$ is a set of eigenvectors of the risk matrix $V_\tau$ in columns, $\Lambda_\tau$ is the corresponding diagonal eigenvalue matrix, and $E'_\tau$ is the transpose of $E_\tau$;

setting components of each of the risk vectors at each tenor $\tau$ in the basis of unit independent risks to the corresponding row of the matrix product $E_\tau \cdot \Lambda_\tau^{1/2}$ relating to each of the assets;

providing a dataset of the term structure of the price of risk $m_\tau$ at each tenor $\tau$ for each of the assets i according to:

$$\frac{dP_{i\tau}}{P_{i\tau}}\frac{\chi_{i\tau}}{\tau} = \frac{dc_{i\tau}}{c_{i\tau}}\frac{\chi_{i\tau}}{\tau} - dr_{f\tau} - dm_\tau \sum_j \psi_{ij\tau} - m_\tau \sum_j d\psi_{ij\tau}$$

wherein, with respect to the tenor $\tau$ and asset i, $dP_{i\tau}$ is the change in contribution to price $P_{i\tau}$ the cash flow $c_{i\tau}$ over a period, $dc_{i\tau}$ is the change in the said cash flow $c_{i\tau}$ over the said period, $dr_{f\tau}$ is the change in the risk free interest rate $r_{f\tau}$ over the said period, $\psi_{ij\tau}$ the jth component of the risk vector for the asset i, $d\psi_{ij\tau}$ is the change in the jth component of the risk vector for the ith asset over the said period, $dm_\tau$ is the change in the price of risk $m_\tau$ over the said period, $\chi_{i\tau}$ is given as $$\left(1 + r_{f\tau} + m_\tau \sum_j \psi_{ij\tau}\right),$$

and the value for $m_\tau$ is estimated by one or more methods of estimation from a cross-sectional analysis over a subset of assets from the set of assets; and outputting the components of each of the risk vectors as a risk vector data set onto a tangible computer-readable recording medium or a display device.

\* \* \* \* \*